United States Patent [19]
Alessandri, Jr.

[11] Patent Number: 4,752,666
[45] Date of Patent: Jun. 21, 1988

[54] MANUAL PERCUSSIVE WELDING APPARATUS

[75] Inventor: Louis A. Alessandri, Jr., Rehoboth, Mass.

[73] Assignee: Triad, Inc., Chartley, Mass.

[21] Appl. No.: 54,286

[22] Filed: May 26, 1987

[51] Int. Cl.⁴ .............................................. B23K 9/22
[52] U.S. Cl. ................................................... 219/95
[58] Field of Search ....................... 219/95, 96, 98, 99

[56] References Cited

U.S. PATENT DOCUMENTS

| | | | |
|---|---|---|---|
| 2,419,749 | 4/1947 | Weinhardt et al. | 219/95 |
| 2,843,724 | 7/1958 | De Graeta et al. | 219/96 |
| 3,138,693 | 6/1964 | Buehler et al. | 219/95 |

Primary Examiner—Clifford C. Shaw
Attorney, Agent, or Firm—Barlow & Barlow, Ltd.

[57] ABSTRACT

A fusion welder has a fixed electrode and mounted above the fixed electrode is a movable electrode. The movable electrode is normally spring loaded to be urged toward the fixed electrode and a latch means holds the movable electrode in a locked position. A capacitor charging circuit provides the necessary arc to establish a weld.

2 Claims, 1 Drawing Sheet

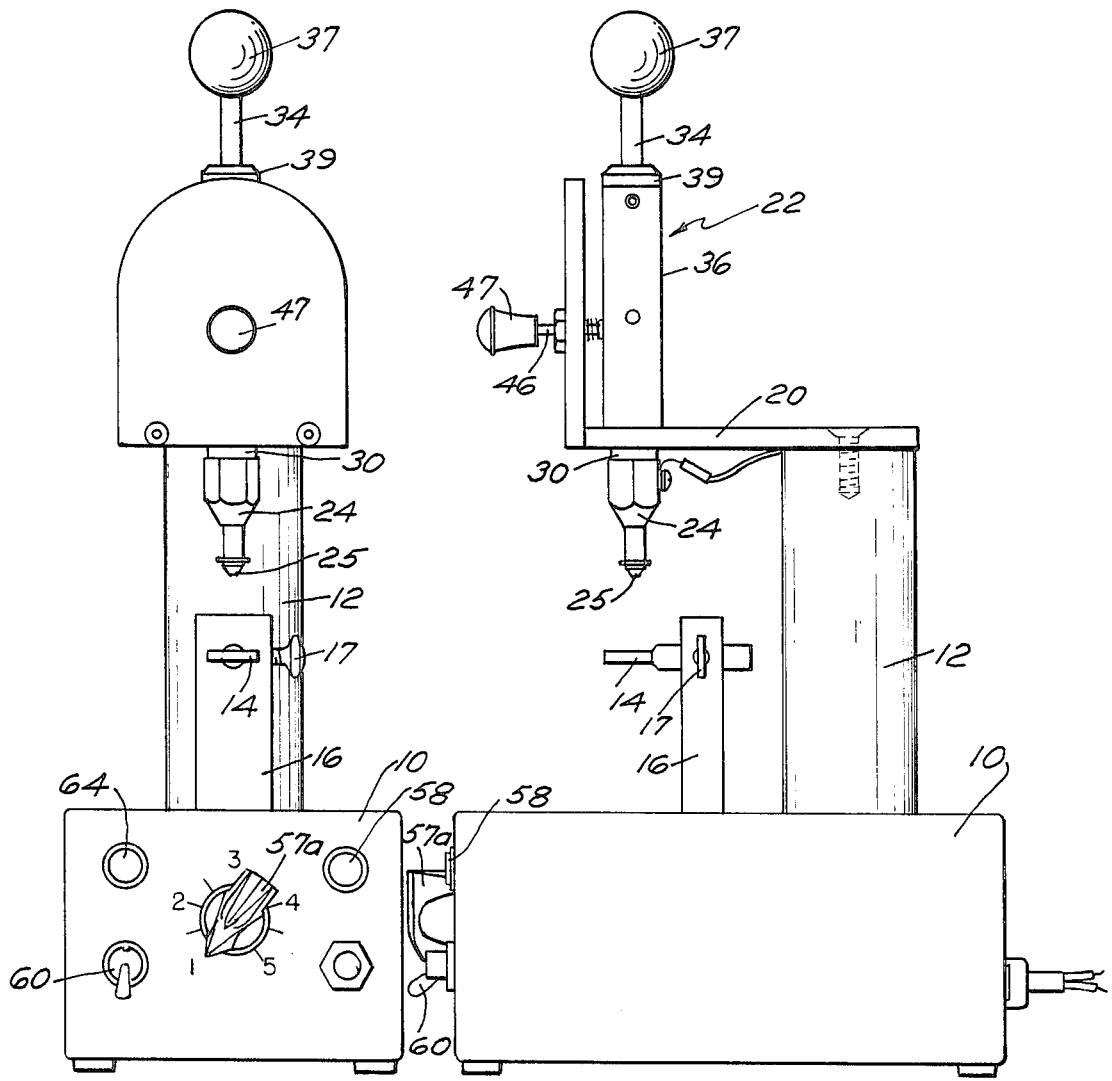
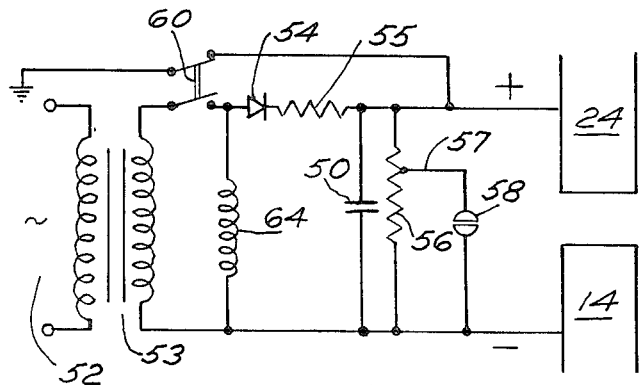
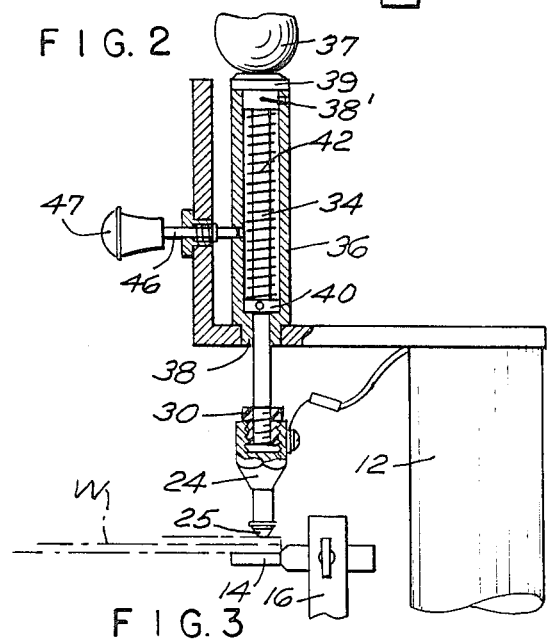
FIG. 1     FIG. 2     FIG. 4     FIG. 3

MANUAL PERCUSSIVE WELDING APPARATUS

BACKGROUND OF THE INVENTION

The present invention relates to welding machines of the type commonly known as fusion welders and it is the general object of the invention to provide a machine of that type that is adaptable for repair use rather than production use.

Welding systems of the general type to which this invention relates are relatively well known in the art and are disclosed in patents such as Spencer U.S. Pat. No. 2,459,847. That particular patent discloses and claims an apparatus and method in which an electrostatic field is generated across the space between the parts so that an arc is provided at a shorter distance than in the absence of a magnetic field, together with the impingement of one electrode against another. While appartus such as described in the above cited patent have adequately performed, there existed a need for a small fusion welding device that is usuable by small repair shops and the like, more particularly with those that deal with the jewelry repairs. Also, there was a need for a device that would be simple to operate and also one of which could be easily controlled insofar as heat settings are concerned.

SUMMARY OF THE INVENTION

The welding apparatus provides a simple elevated stationary electrode anvil and a spring loaded movable upper electrode which is normally locked into position and which may be readily released by pulling a knob to allow the electrode to move rapidly under the urgence of the spring toward the fixed electrode/anvil. The electrical part of the apparatus includes a simple charging network for a capacitor with an indicator that detects the degree of charge so that when a certain degree is reached, the device may be quickly operated to perform the welding cycle.

DESCRIPTION OF THE DRAWING

FIG. 1 is a front elevational view of welding apparatus made in accordance with the invention;

FIG. 2 is a side elevational view thereof;

FIG. 3 is a partial elevational view of the apparatus with parts broken away and in section to illustrate the workings of the movable electrode; and FIG. 4 is a schematic circuit diagram illustrating a preferred embodiment of certain circuitry used in the apparatus of FIGS. 1 and 2.

DESCRIPTION OF THE PREFERRED EMBODIMENT

Referring to the drawing, there is illustrated a suitable apparatus for carrying out the present invention which consists essentially of a base 10 which houses the electrical components. The base supports a vertical post 12 as well as a first fixed electrode 14, the electrode being supported on a post 16 and of a nature whereby it may be readily changed, being held in position by a clamp screw 17. An arm 20 extends from the post 12 and supports a second upper electrode assembly generally designated 22. Essentially the upper electrode 24 may have a variety of forms, their being illustrated, for example, a pointed tip 25 in the drawing. The electrode 24 has a threaded bore and fitted therein is an insulator sleeve 30 which has a threaded stud portion as well as its own threaded bore and into the latter there may be received a rod 34 which extends upwardly thru a tubular structure or housing 36 terminating in a knob 37. The rod 34 is guided for movement by bushings as at 38 and 38' and centrally thereof, there is fitted a piston plate 40. A compression spring 42 extends between the plate 40 and the cap assembly 39 while the plate 40 may be maintained in position with the spring compressed by a latch post or stud 46 which has an operating knob 47.

Referring now to FIG. 3, 50 designates a storage capacitor that is adapted to be charged from a suitable source of eletromotive force here shown as a commercial alternating current supply source 52 with an isolating transformer 53, the secondary of which is connected via a rectifier 54 and a charging resistor 55 to the capacitor 50. To control the amount of charging for any given operation, a potentiometer 56 which has a resistance on the order of 150,000 ohms connected across the capacitor 50 and its variable tap arm 57 is connected to indicator lamp 58, the arrangement being such that, as the arm position is changed on the fixed leg of the potentiometer the lamp will ignite at varying voltages which are indicative of the amount of charge on the capacitor 50. To this end, for setting purposes, therefore, the arm 57 will have a knob 57a as seen in FIG. 1 with scale markings on the base 10 to indicate varying charge values to the operator. When the proper amount of charge has been achieved, then the knob 47 may be pulled outwardly as viewed in the drawing, allowing the upper electrode to drop downwarly and engage work which will be placed upon the fixed electrode 14, thereby discharging the capacitor.

To initiate a charge to the capacitor and to provide a discharge path for the same, a double pole switch 60 is provided and it will be seen by those skilled in the art that, with the switch in its normal off position, the capacitor is discharged to ground thru the grounding wire in the power cord. When the switch is closed, the power is now applied via the rectifier to the capacitor an indicator lamp 64 showing that the device is on.

There has been herein described a preferred embodiment to the invention but other embodiments within the scope of the appended claims will be obvious to those skilled in the art.

I claim:

1. Apparatus for electric fusion welding comprising a fixed member for mounting a work piece providing a first electrode, a second movable electrode movable toward and from the first electrode between working and retracted positions, an arm extending across and above the first electrode, a tubular housing having and end thereof fastened to the arm, said second electrode having a support post insulated therefrom and mounted for reciprocal movement within said housing, spring means, said post normally urged by said spring means toward the first electrode, locking means holding the post in a position away from the first electrode, said locking means having a stud with a knob passing thru the housing to normally engage the post and a spring normally urging the stud into the housing whereby when the locking means is disengaged from the post, the post and the second electrode will travel by urgence of the spring toward the first electrode.

2. Apparatus as in claim 1 wherein electric welding energy is supplied across the electrodes and wherein a normally open switch is connected from ground to one electrode the closure of which discharges any residual energy.

\* \* \* \* \*